US005236770A

United States Patent [19]

Assent et al.

[11] Patent Number: 5,236,770

[45] Date of Patent: Aug. 17, 1993

[54] NONWOVEN LAMINATE

[75] Inventors: Hans C. Assent; Jürgen Knoke, both of Weinheim; Manfred Jöst, Hemsbach, all of Fed. Rep. of Germany

[73] Assignee: Carl Freudenberg, Weinheim, Fed. Rep. of Germany

[21] Appl. No.: 883,429

[22] Filed: May 13, 1992

[30] Foreign Application Priority Data

Jul. 30, 1991 [DE] Fed. Rep. of Germany ....... 4125151

[51] Int. Cl.⁵ ............................................ B32B 27/14

[52] U.S. Cl. ........................................ 428/198; 2/272; 428/110; 428/138; 428/284; 428/287; 428/293; 428/296; 428/300; 428/402

[58] Field of Search ............... 428/198, 137, 138, 286, 428/296, 300, 284, 402, 287, 110, 293

[56] References Cited

U.S. PATENT DOCUMENTS

| | | | |
|---|---|---|---|
| 4,722,857 | 2/1988 | Tomioka et al. | 428/293 |
| 4,737,396 | 4/1988 | Kamat | 428/198 |
| 5,176,949 | 1/1993 | Allagnat et al. | 428/198 |

*Primary Examiner*—James J. Bell

*Attorney, Agent, or Firm*—Felfe & Lynch

[57] ABSTRACT

A textile laminate consists of a nonwoven padding material of low specific volume and of a filament-reinforced nonwoven, the laminate having a total thickness of more than 2 mm. The nonwoven padding material has a raw density of less than 0.025 $g/cm^3$ and a thickness of 1.6 to 60 mm. The filament-reinforced nonwoven is composed to 10 to 60 $g/m^2$ of a fleece with a raw density greater than 0.35 $g/cm^3$ and of 3 to 10 $g/m^2$ reinforcing filament and is laminated onto the nonwoven padding material.

6 Claims, 1 Drawing Sheet

4

3

2

1

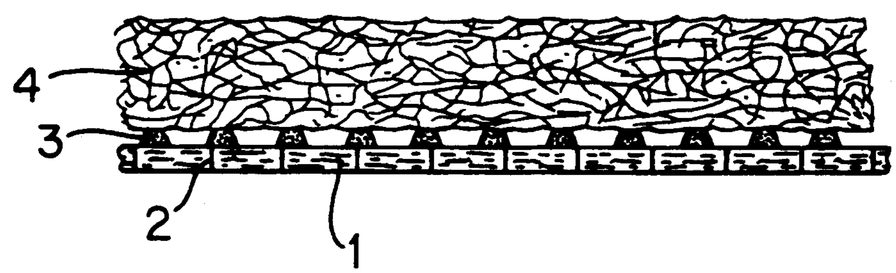
4
3
2
1

NONWOVEN LAMINATE

FIELD OF THE INVENTION

This invention relates to a novel laminate consisting of a nonwoven padding material of low specific volume and of a filament-reinforced nonwoven, the total thickness of the laminate being more than 2 mm. The nonwoven padding material has a raw density of less than 0.025 g/cm$^3$ and a thickness of 1.6 to 60 mm. The filament-reinforced nonwoven is composed of 10 to 60 g/m$^2$ of a fleece with a raw density of more than 0.035 g/cm$^3$ and of 3 to 110 g/cm$^2$ reinforcing filament and is laminated onto the nonwoven padding.

BACKGROUND OF THE INVENTION

Nonwoven, filament-reinforced interlinings wherein the reinforcement filaments are laid in the warp direction or in a warp-plus-short-filling or warp-plus-filling direction have been increasingly widely used in the garment industry.

Nonwoven interlinings reinforced with filaments in the warp-plus-filling direction are disclosed in Published European Application No. 119 754. The publication Chemiefasern/Textilindustrie 39, 91, (May 1989), 5124, describes the technology. However, in neither of these publications is there any mention of laminates which consist of a nonwoven padding without a filament reinforcement and with a raw density below 0.025 g/cm$^3$, or of a filament-reinforced nonwoven with a raw density (without reinforcement) of more than 0.035 g/cm$^3$.

Especially in the case of warp reinforcement, the improvement of strength and reduction of elongation in one direction increases the range of applications of normal nonwovens.

For example, this feature is important for a waist-band interlining in which high strength and short elongation in the direction of the waist-band are needed. A similar application for interlinings is in the edge of wool coats, where a nonwoven is basically desirable (relatively good bulk combined with light weight), but where the strength in the edge direction in a normal nonwoven is insufficient and a reinforcement with warp filaments makes its use at all possible.

Warp-plus-short-filling and warp-plus-filling reinforcement of a nonwoven are also of interest for other uses.

Padding materials with strength in one direction are of primary interest in the placket area as a placket reinforcement as well as for normal padding in anoraks, winter clothing and the like, but in comparison with ordinary padding materials, such materials are characterized by certain utilitarian advantages.

Basically, in warp and warp-plus-filling as well as in warp-plus-short-filling reinforcement a striking reduction of the bulk of the padding materials is observed, which simultaneously increases their density. This is of no importance for a number of areas of application. Basically, however, this results in two serious disadvantages:

1) Due to the reduction in volume, more fibers are needed in order to produce an equal volume, which results in a significant increase in cost.
2) Thick padding materials cannot be warp-reinforced above 1 cm, because this is not feasible with conventional machines.

OBJECTS OF THE INVENTION

It is an object of the present invention to provide for the first time a laminate composed of a padding material and a filament-reinforced nonwoven, the laminate having a total thickness of more than 2 mm. At the same time, a high strength is to be achieved by filament reinforcement either only in the warp direction or also in both directions, without the need of having to accept the formerly observed loss of bulk of the padding nonwoven laminate. This high bulk is to be achieved by minimizing the use of fibers.

Other objects and advantages of the present invention will become apparent as the description thereof proceeds.

DESCRIPTION OF THE INVENTION

We have discovered that the above objects are achieved by a laminate consisting of a nonwoven padding without filament reinforcement of low specific volume and of a filament-reinforced nonwoven, the laminate having a total thickness of more than 2 mm with no upper limit, where the nonwoven padding has a raw density of less than 0.025 g/cm$^3$ and a thickness of 1.6 to 60 mm, and a filament-reinforced nonwoven composed of 10 to 60 g/m$^2$ of nonwoven with a raw density greater than 0.035 g/cm$^3$ and of 3 to 100 g/m$^2$ filament reinforcement is laminated onto the nonwoven padding.

Thus, the laminate consists of a nonwoven padding of low specific volume and of a filament-reinforced nonwoven. The laminate has a total thickness of more than 2 mm, the upper limit being determined by the user's requirement.

The padding material itself has a raw density of less than 0.025 g/cm$^3$ and a thickness of more than 1.6 mm, where the upper limit which can still be processed is 60 mm. The nonwoven padding contains no filament reinforcement. The nonwoven padding is laminated onto a filament-reinforced nonwoven which is composed of 10 to 60 g/m$^2$ nonwoven with a raw density of more than 0.035 g/cm$^3$ and of 3 to 100 g/m$^2$ filament reinforcement. In this laminate the filament reinforcement can face either the interior of the laminate cross section, or it can also face outward.

Since, pursuant to the object of the present invention, a high volume must be maintained, it goes without saying that the lamination has to be performed so as to avoid any reduction in volume. Those skilled in the art know how to proceed for this purpose, namely by laminating the layers in the heating zone not with the aid of pressure but rather with a gap.

The laminate prepared in this manner can be used without an adhesive, but it may have a dotted adhesive applied to the filament-reinforced nonwoven to serve as a fixing interface.

The lamination must be performed so that the volume will be retained insofar as possible For this purpose the filament-reinforced simple nonwoven may be provided with a dotted adhesive, or it may be sprinkled with adhesive powder, or an air-permeable adhesive mesh may be placed upon it. In all these cases a continuous press may be used in which the adhesion is effected with as little pressure as possible.

Other possibilities are the use of radio frequency or hot needles penetrating the thin, reinforced nonwoven down to the surface of the nonwoven padding. In the latter cases the fibers of the padding material and of the filament-reinforced nonwoven must, of course, be thermoplastic.

Materials of this type may be used as interlinings in the clothing industry. However, they also offer the possibility of use in the padding of bedding material and are advantageous in their combination of volume and strength.

In connection with interlinings, the use of charmeuse as a covering for nonwoven padding to improve fiber migration is well known.

The laminate of the present invention, however, offers the following advantages over this combination:

1) The stability in the direction of the filament reinforcement is greater than in the case of the use of charmeuse.
2) The fiber migration of an open charmeuse covering is, pursuant to a series of tests which we performed, only partially improved with respect to the covered nonwoven padding, whereas the filament-reinforced nonwoven offers a substantially improved protection because of the fact that no holes are present.

For the combination of softness, strength and low fiber migration it may be desirable in some cases to cover a voluminous nonwoven padding material on both sides with a filament-reinforced, thin nonwoven, or on one side with a filament-reinforced nonwoven and on the other side with a nonwoven which is not filament reinforced In either of these cases, however, a laminate in accordance with the present invention is provided, said laminate being composed of a padding material without filament reinforcement and of a filament-reinforced nonwoven, which combination alone contributes to the solution of the stated object of preserving the volume of the laminate in the case of an anisotropic strength characteristic in the laminate.

The following example illustrates the present invention and will enable others skilled in the art to understand it more completely. It should be understood, however, that the invention is not limited solely to the particular example given below.

EXAMPLE

A nonwoven padding was prepared in the following manner: 100 g/m$^2$ of polyester fibers of 3.3 dtex were laid with transverse cards and sprayed on each side with 8 g/m$^2$ of a polyacrylate binder containing methylol acrylamide groups, dried, and the binder was condensed at 160° C. This nonwoven padding was wound up. It had a thickness of about 13 mm, measured in accordance with DIN 53855, part 2.

A filament-reinforced nonwoven was prepared as follows: 25 g/m$^2$ of a 100% nylon 6 fleece was laid with transverse cards and bonded with a spot welding calander at 200° C. to form a nonwoven fabric. This nonwoven was rolled up and was then coated with dots of a copolyester hot-melt adhesive at 12 g/m$^2$. This nonwoven was reinforced with warp filaments in conventional manner so that polyester filaments 50f22 are shot in with a density of about 3.6/cm. This reinforced nonwoven was printed on one side with dots of a copolyester hot-melt adhesive at 12 g/m$^2$.

The two nonwovens prepared in this manner were laminated together on a Meyer continuous press so that the filament-reinforced nonwoven came to lie with the adhesive side on the nonwoven padding.

The temperature on the filament-reinforced nonwoven side was 160° C., and on the side of the nonwoven padding it was 180° C.; the throughput rate was 10 m/min. The heating zone was approximately 2.5 meters long.

The layers were laminated with a gap instead of with pressure, so as to preserve the total volume as much as possible in the fixing process.

The attached drawing is a schematic cross section of a laminate according to the present invention, which is composed of the nonwoven base 1, the warp reinforcement 2, the dotted adhesive 3 and the nonwoven padding 4.

While the present invention has been illustrated with the aid of a certain specific embodiment thereof, it will be readily apparent to others skilled in the art that the invention is not limited to this particular embodiment, and that various changes and modifications may be made without departing from the spirit of the invention or the scope of the appended claims.

We claim:

1. A textile laminate comprising a nonwoven padding having a low specific volume, and a filament-reinforced nonwoven adhesively laminated onto said nonwoven padding, said laminate having a total thickness of more than 2 mm, said nonwoven padding having a raw density of less than 0.025 g/cm$^3$ and a thickness of 1.6 to 60 mm, said filament-reinforced nonwoven being composed of 10 to 60 g/m$^2$ of nonwoven with a raw density of more than 0.035 g/cm$^3$ and 3 to 100 g/m$^2$ of a filament reinforcement extending only in the warp direction of said nonwoven.

2. A textile laminate of claim 1, where said nonwoven padding and said filament-reinforced nonwoven are bonded together by a dotted hot-metal adhesive.

3. A textile laminate of claim 1, where said nonwoven padding and said filament-reinforced nonwoven are bonded together by a hot-melt powder applied broadly over their respective facing surfaces.

4. A textile laminate of claim 1, where said nonwoven padding and said filament-reinforced nonwoven are bonded together by an adhesive mesh having a low melting point.

5. A textile laminate of claim 1, where the fibers of said nonwoven padding and said filament-reinforced nonwoven are thermoplastic fibers which are welded to one another.

6. A textile laminate of claim 1, where the fibers of said nonwoven padding and said filament-reinforced nonwoven are needled to one another.

* * * * *